United States Patent
Takahashi

(10) Patent No.: US 10,511,241 B2
(45) Date of Patent: Dec. 17, 2019

(54) MOTOR CONTROL DEVICE AND PRINTER

(71) Applicant: TOSHIBA TEC KABUSHIKI KAISHA, Tokyo (JP)

(72) Inventor: Takahide Takahashi, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/028,755

(22) Filed: Jul. 6, 2018

(65) Prior Publication Data
US 2019/0036466 A1 Jan. 31, 2019

(30) Foreign Application Priority Data

Jul. 25, 2017 (JP) .................................. 2017-143545

(51) Int. Cl.
| | | |
|---|---|---|
| *H02P 8/12* | (2006.01) | |
| *B41J 23/02* | (2006.01) | |
| *B41J 25/00* | (2006.01) | |
| *B41J 11/42* | (2006.01) | |
| *B41J 19/20* | (2006.01) | |

(52) U.S. Cl.
CPC ............. *H02P 8/12* (2013.01); *B41J 11/42* (2013.01); *B41J 19/202* (2013.01); *B41J 23/025* (2013.01); *B41J 25/001* (2013.01)

(58) Field of Classification Search
None
See application file for complete search history.

(56) References Cited

U.S. PATENT DOCUMENTS

| | | | |
|---|---|---|---|
| 5,327,052 A | 7/1994 | Sakurai et al. | |
| 6,538,407 B2 | 3/2003 | Tanaka | |
| 6,756,760 B2 | 6/2004 | Tanaka et al. | |
| 2001/0028231 A1* | 10/2001 | Tanaka | B41J 11/42 |
| | | | 318/445 |
| 2002/0163568 A1 | 11/2002 | Takeishi | |
| 2007/0267996 A1 | 11/2007 | Shibasaki et al. | |

FOREIGN PATENT DOCUMENTS

| | | |
|---|---|---|
| EP | 1124320 A2 | 8/2001 |
| EP | 1129856 A1 | 9/2001 |
| JP | H07-164706 A | 6/1995 |

OTHER PUBLICATIONS

Extended European Search Report dated Dec. 13, 2018, filed in counterpart European Patent Application No. 18184108.1, 11 pages.

* cited by examiner

*Primary Examiner* — Matthew Luu
*Assistant Examiner* — Tracey M McMillion
(74) *Attorney, Agent, or Firm* — Kim & Stewart LLP

(57) ABSTRACT

A motor control device includes a motor driver and a control unit. The motor driver supplies a drive current to a stepping motor. The control unit is configured to control the motor driver to start a supply of the drive current to the stepping motor in response to a start instruction, and increase the drive current to the stepping motor from zero to a predetermined current value stepwise over a predetermined time period.

11 Claims, 6 Drawing Sheets

FIG. 2

| NO. | COMPARISON VALUE |
|---|---|
| 1 | C1 |
| 2 | C2 |
| 3 | C3 |
| 4 | C4 |
| 5 | C5 |
| 6 | C6 |
| 7 | C7 |
| 8 | C8 |
| 9 | C9 |
| 10 | C10 |
| 11 | C11 |
| 12 | C12 |
| 13 | C13 |
| ⋮ | ⋮ |

MOTOR CONTROL DEVICE AND PRINTER

CROSS-REFERENCE TO RELATED APPLICATION

This application is based upon and claims the benefit of priority from Japanese Patent Application No. 2017-143545, filed Jul. 25, 2017, the entire contents of which are incorporated herein by reference.

FIELD

Embodiments described herein relate generally to a motor control device and a printer.

BACKGROUND

A printer of one known type prints a two-dimensional image on a printing medium using a print head which prints a raster constituting an image a portion at a time and performing sub-scanning by moving at least one of the printing medium and the print head relative to each other by a movement mechanism. The movement mechanism is, in one example, provided with a stepping motor as a driving source.

In a non-energized state of the stepping motor, a stop position is indeterminate. Therefore, when the stepping motor is activated, a current of a predetermined current value is supplied for a predetermined period prior to the start of actual rotational driving to reach a stopped state while in an energized state. This operation is known as pre-hold, for example, and the above-described current is known as a pre-hold current.

However, when suddenly supplying the pre-hold current from the non-energized state, vibration occurs during rotation of the motor. If the rotational drive is started in a state where the vibration is present, there is a possibility of step-out. To prevent the step-out, it is necessary to continue the pre-hold for a sufficient time for the above vibration to sufficiently dissipate. The longer a period of the pre-hold, the longer a waiting time until printing can be started.

Therefore, it is desirable to shorten the pre-hold period while being able reduce the risk of step-out.

DESCRIPTION OF THE DRAWINGS

FIG. 2 is a diagram schematically illustrating contents of a setting table stored in a memory of the printer.

DETAILED DESCRIPTION

An object of an exemplary embodiment is to provide a motor control device and a printer capable of shortening the pre-holding period while reducing the risk of step-out.

In general, according to one embodiment, a motor control device includes a motor driver and a control unit. The motor driver supplies a drive current to a stepping motor. The control unit is configured to control the motor driver to start a supply of the drive current to the stepping motor in response to a start instruction, and increase the drive current to the stepping motor from zero to a predetermined current value stepwise over a predetermined time period.

Hereinafter, an example of an embodiment will be described with reference to the drawings.

Figure 1:
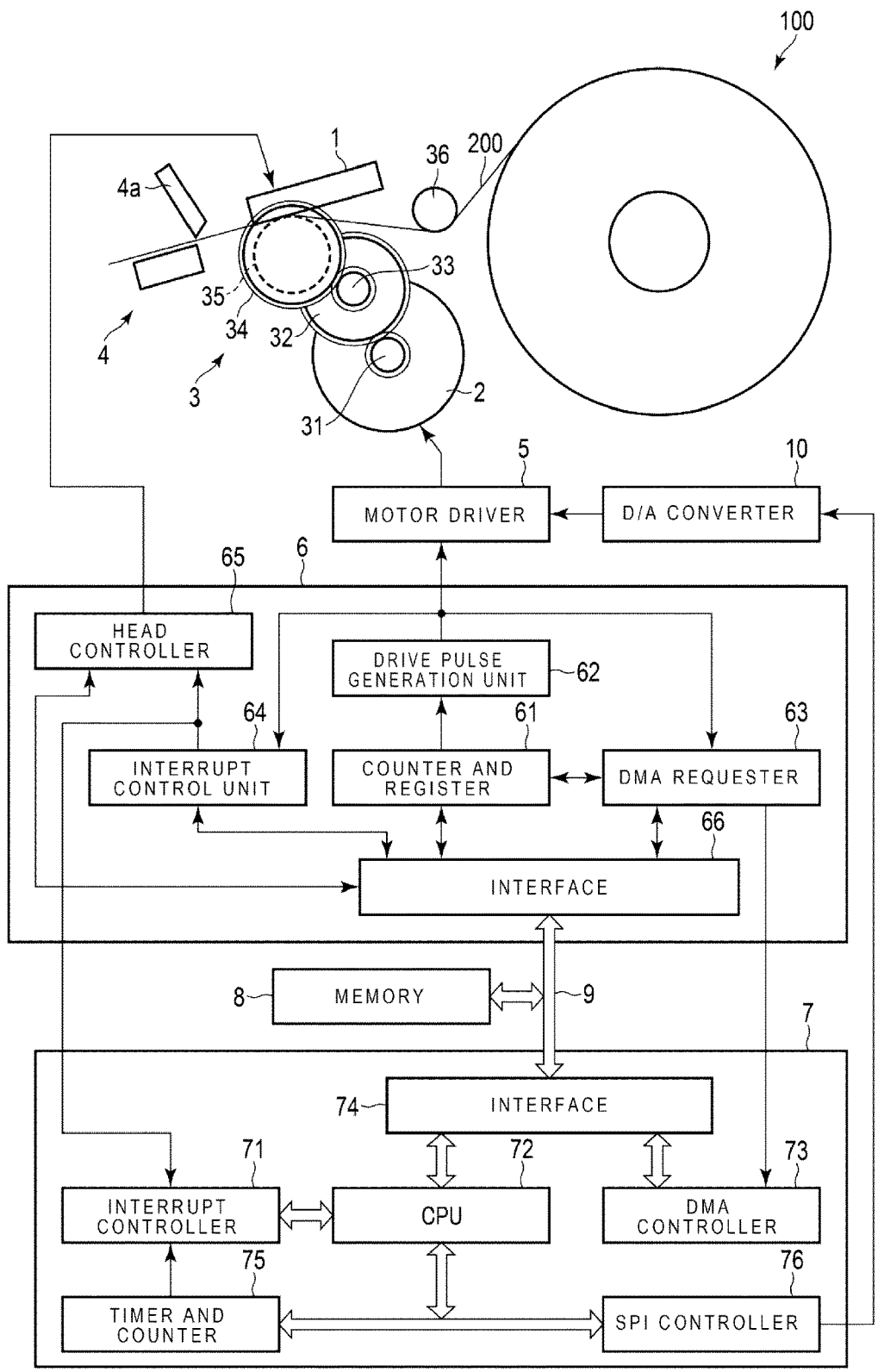
FIG. 1 is a diagram illustrating components of a printer and a block diagram of a main circuit of the printer.

FIG. 1 is a diagram illustrating components of a printer and a block diagram of a main circuit of the printer. A thermal printer will be described as an example.

As illustrated in FIG. 1, a printer 100 includes a thermal head 1, a stepping motor 2, a conveying mechanism 3, a cutter unit 4, a motor driver 5, a drive control unit 6, a printer control unit 7, a memory 8, a bus 9, and an digital to analog (D/A) converter 10.

The thermal head 1 is a type of print head configured to print an image on a printing medium 200 using heat generated by each of a plurality of heating elements. The thermal head 1 can change a temperature of each of the plurality of the heating elements individually and in a plurality of stages, and can print a multi-gradation image. The plurality of the heating elements are linearly disposed at a constant interval along a depth direction in FIG. 1. The heating element is only one row in this embodiment, but may be a plurality of rows. A material of the printing medium 200 is typically paper. However, the printing medium 200 made of a material other than paper may be used.

The stepping motor 2 generates a rotational force as a driving force for conveying the printing medium 200. As the stepping motor 2, various types of devices can be used. In this embodiment, a stepping motor having a relatively low resolution such as a permanent magnet type (PM type) is used.

The conveying mechanism 3 further includes gears 31, 32, 33, 34, a platen roller 35, and a guide roller 36. A first gear 31 is fixed to a rotating shaft of the stepping motor 2 (hereinafter, referred to as a first rotating shaft) and rotates by a rotational force of the stepping motor 2. A second gear 32 is fixed to another rotating shaft (hereinafter, referred to as a second rotating shaft) substantially parallel to the first rotating shaft and meshes with the first gear 31. A third gear 33 is fixed to the second gear 32 and the second rotating shaft. A fourth gear 34 is fixed to another rotating shaft (hereinafter, referred to as a third rotating shaft) substantially parallel to the second rotating shaft and meshes with the third gear 33. The platen roller 35 has an axial center along the depth direction in FIG. 1 and is fixed to the third rotating shaft in a state where an axis thereof substantially coincides with an axis of the third rotating shaft. A width along an axial direction of the platen roller 35 is larger than a maximum width of the printing medium 200. The guide roller 36 is rotatably supported substantially parallel to the platen roller 35. The conveying mechanism 3 changes a relative position of the printing medium 200 and the thermal head 1 by feeding the printing medium 200 in a direction intersecting a raster direction. The conveying mechanism 3 is an example of a movement mechanism. Instead of the conveying mechanism 3, sub-scanning may be performed by providing a movement mechanism for moving the thermal head 1 and changing a position of the thermal head 1 with respect to the fixed printing medium 200. Alternatively, in addition to the conveying mechanism 3, sub-scanning may be performed by providing the movement mechanism for moving the thermal head 1, and conveying the printing medium 200 while moving the thermal head 1. In this case, a combination of the conveying mechanism 3 and the movement mechanism for moving the thermal head 1 constitutes the movement mechanism for changing the relative position in the direction intersecting the raster direction between the printing medium 200 and the thermal head 1.

The cutter unit 4 is provided with a movable piece 4a, and the printing medium 200 is cut by moving the movable piece 4a by a solenoid (not illustrated). As the cutter unit 4, another type of unit such as a cutter using a rotary cutter may be used. In addition, the cutter unit 4 may be optional.

The motor driver 5 drives the stepping motor 2 in a micro step drive system in synchronization with an externally applied drive pulse. In the embodiment, 2W1-2-phase excitation is applied, for example.

The drive control unit 6 synchronously operates the thermal head 1 and the motor driver 5 to realize a printing of a two-dimensional image by a main scanning by the thermal head 1 and a sub-scanning by conveying of the printing medium 200. The drive control unit 6 is configured using, for example, a field-programmable gate array (FPGA) or an application specific integrated circuit (ASIC) and is provided with a counter and register 61, a drive pulse generation unit 62, a direct memory access (DMA) requester 63, an interrupt control unit 64, a head controller 65, and an interface 66.

The counter and register 61 has a counter that measures an elapsed time using a predetermined clock and a register that stores a comparison value for comparison with a count value of the counter. The register is, for example, a so-called compare match register. The counter and register 61 outputs the count value and the comparison value to the drive pulse generation unit 62.

The drive pulse generation unit 62 is a circuit that outputs the drive pulse when the count value and the comparison value output from the counter and register 61 coincide with each other. In addition to being applied to the motor driver 5, this drive pulse is applied to the DMA requester 63 and the interrupt control unit 64.

The DMA requester 63 is a circuit that outputs a DMA request to the printer control unit 7 when the drive pulse is input. The DMA requester 63 does not output the DMA request in the disabled state.

The interrupt control unit 64 is a circuit that outputs a raster pulse each time a predetermined number of the drive pulses are input. The raster pulse is applied to the head controller 65 and is applied to the printer control unit 7 as an interrupt signal.

The head controller 65 is a circuit that drives the thermal head 1 according to the raster data included in the print data. The raster data is data representing one raster of the image.

The interface 66 is a circuit that performs processing for communication with the printer control unit 7 via the bus 9.

The printer control unit 7 includes an interrupt controller 71, a central processing unit (CPU) 72, a DMA controller 73, an interface 74, a timer and counter 75, and a serial/parallel interface (SPI) controller 76.

The interrupt controller 71 inputs the raster pulse output from the interrupt control unit 64 as one of interrupt signals. The interrupt controller 71 inputs an increment pulse that is output from the timer and counter 75 (as described later) as one of the interrupt signals. An interrupt signal output from another portion (not illustrated) in the printer 100 is also input to the interrupt controller 71. When the interrupt signal is input, the interrupt controller 71 notifies the CPU 72 of an interrupt. If a plurality of interrupt signals compete with each other, the interrupt controller 71 sequentially notifies the CPU 72 of these interrupts in accordance with a predetermined order of priority.

The CPU 72 performs information processing for comprehensively controlling the printer 100 based on a program stored in the memory 8.

In response to the DMA request from the DMA requester 63, the DMA controller 73 sets a comparison value indicated in a setting table stored in the memory 8 in the register of the counter and register 61 via the bus 9 and the interfaces 66 and 74.

The interface 74 performs processing for communication with the drive control unit 6 via the bus 9.

During the pre-hold period, the timer and counter 75 outputs the increment pulse to the interrupt controller 71 at predetermined time intervals.

The SPI controller 76 sends a set current value that the CPU 72 outputs in parallel under the interrupt control by the interrupt controller 71 corresponding to the increment pulse output from the timer and counter 75 to the D/A converter 10 by serial communication.

The memory 8 stores the program described above. In addition, the memory 8 stores various data related to the operation of the printer 100. The data includes an initial comparison value and the setting table. The initial comparison value is a value determined according to a time period of a pre-hold time period of the stepping motor 2. Specifically, if the time of the pre-hold period is represented by $T_p$ and a time interval of a clock pulse counted by the counter of the counter and register 61 is represented by $T_{clk}$, the initial comparison value is a value obtained as $[T_p/T_{clk}]$.

The bus 9 is, for example, a 16-bit bus, and transmits various data exchanged between the drive control unit 6 and the printer control unit 7.

The D/A converter 10 outputs a voltage value corresponding to the set current value sent from the SPI controller 76 to the motor driver 5 as a reference voltage.

FIG. 2 is a diagram schematically illustrating contents of the setting table stored in the memory 8.

The setting table illustrates one comparison value C1, C2, C3, . . . in association with each of consecutive numbers.

A comparison value C13 is a value determined in accordance with a time interval T13 of the drive pulse continuously supplied to the motor driver 5 in order to rotate the stepping motor 2 at a target speed. Specifically, the comparison value C13 is a value obtained as $[T_{13}/T_{clk}]$.

In a "slow-up" state in which the stepping motor 2 is accelerated from a stationary state to the target speed, the time interval between consecutive two drive pulses is normally gradually reduced from T1 which is longer than T13. The time intervals at this time are represented as T1, T2, . . . , T12. That is, the time intervals T1, T2, . . . , T12 are such that T1 is the maximum, gradually decrease in the order of T1, T2, . . . , T12, and T12 becomes the minimum.

Most of the comparison values C1 to C12 are values obtained by dividing the time intervals T1 to T12 by the time interval $T_{clk}$. However, at least one of the comparison values C1 to C12 is a value obtained by dividing a time interval, which is obtained by adding a predetermined time period $\Delta T$ to the corresponding time interval by the time interval $T_{clk}$. For example, the comparison values C6 and C10 are obtained by $[(T_6+\Delta T)/T_{clk}]$ and $[(T_{10}+\Delta T)/T_{clk}]$, respectively. The comparison values C1 to C5, C7 to C9, C11, and C12 are values obtained by dividing T1 to T5, T7 to T9, T11, and T12 by the time interval $T_{clk}$. The value of $\Delta T$ for the comparison value C6 and the value of $\Delta T$ for the comparison value C10 may be the same value as each other or different values from each other. However, $\Delta T$ is determined such that the comparison value C6 is larger than the comparison value C5 and the comparison value C10 is larger than the comparison value C9.

The embodiment is an example in which the motor driver 5 completes the "slow-up" of the stepping motor 2 by supplying 12 drive pulses. However, this is in consideration of simplification of description and illustration. In general, the "slow-up" is completed by supplying more drive pulses. However, the slow-up may be completed by supplying fewer drive pulses.

In the setting table, in addition to the comparison values C1 to C13, a comparison value for slowing down the stepping motor 2 is included, but illustration thereof is omitted. Each of the comparison values illustrated in the setting table is determined by, for example, a designer of the printer 100.

Next, the operation of the printer 100 will be described. The following description focuses on the slow-up operation. Descriptions of operations similar to those performed in conventional printers of the same type may be omitted.

Figure 3:
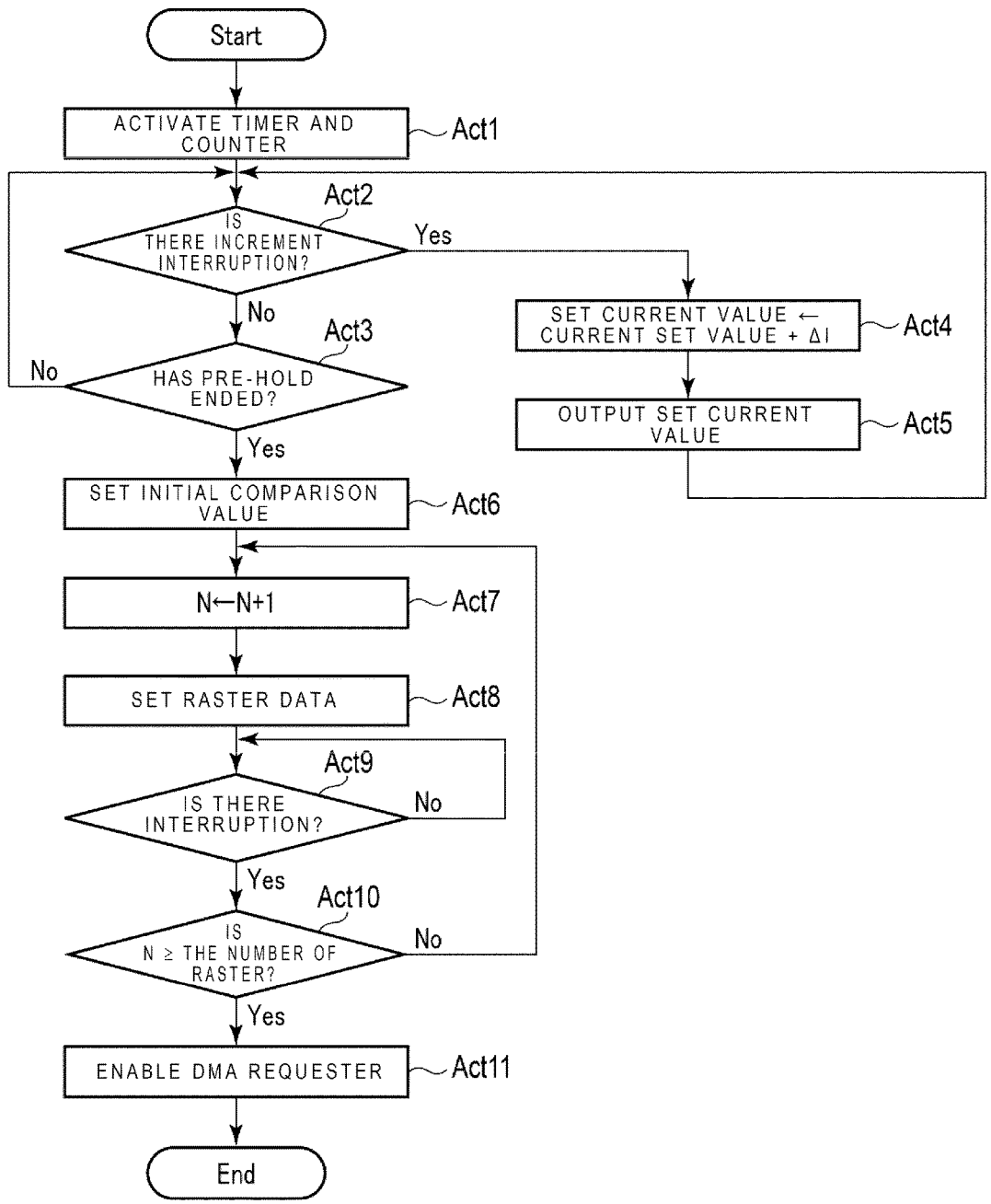
FIG. 3 is a flowchart of information processing by a CPU of the printer.

FIG. 3 is a flowchart of information processing by the CPU 72 based on a program stored in the memory 8.

When an event requiring the start of printing occurs, the CPU 72 starts the information processing according to the flowchart in FIG. 3.

In Act 1, the CPU 72 activates the timer and counter 75.

Figure 4:
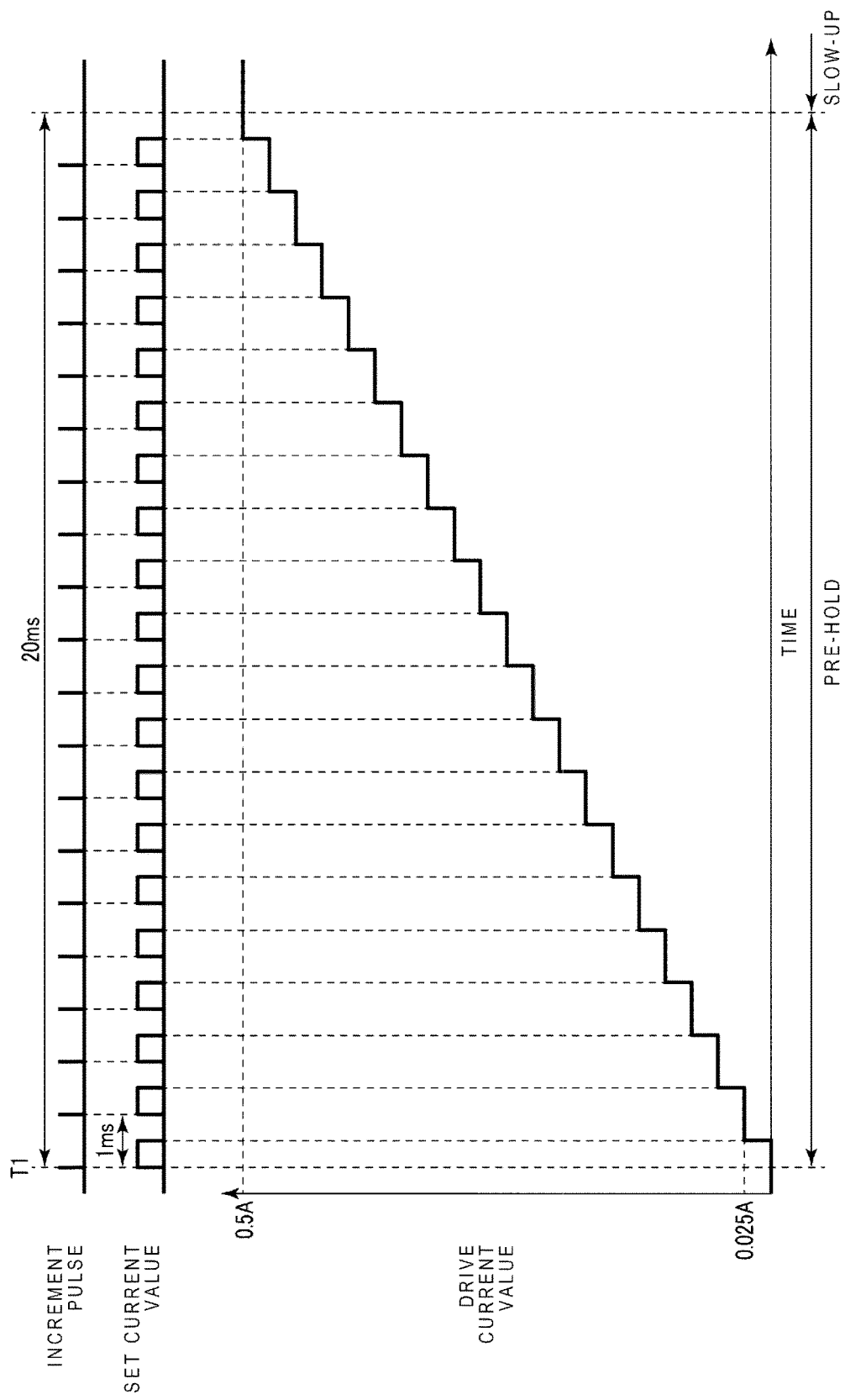
FIG. 4 is a timing chart of an operation of the printer according to an operation of a timer and counter.

FIG. 4 is a timing chart of an operation of the printer 100 according to an operation of a timer and counter 75.

When the timer and counter 75 is activated, first, an initial increment pulse is output (at time point T1). The timer and counter 75 repeatedly outputs a predetermined number of increment pulses at constant time intervals, including the initial increment pulse. The number of increment pulses output from the timer and counter 75 is a number obtained by dividing a predetermined time as a length of the pre-hold period by the above time interval. FIG. 4 illustrates an example if the length of the pre-hold period is set to 20 ms and the time interval of the increment pulse is set to 1 ms. Therefore, the timer and counter 75 outputs the increment pulse 20 times.

In Act 2, the CPU 72 confirms whether or not an increment interruption has occurred. In response to the fact that the increment pulse is output, the CPU 72 makes a determination of No if an interrupt notice from the interrupt controller 71 is not made, and proceeds to Act 3.

In Act 3, the CPU 72 confirms whether or not the pre-hold period has ended. If 20 ms has not elapsed since activating the timer and counter 75 in Act 1, the CPU 72 makes a determination of No and returns to Act 2.

In this manner, the CPU 72 waits for an increment interruption in Act 2 or termination of the pre-hold period in Act 3.

When the timer and counter 75 outputs the increment pulse as described above, this output is notified to the CPU 72 by the interrupt controller 71. As a result, the CPU 72 makes a determination of Yes in Act 2 and proceeds to Act 4.

In Act 4, the CPU 72 updates the set current value to a value obtained by adding a predetermined increase value $\Delta I$ to the present value. The set current value is cleared by the CPU 72 at the start of information processing illustrated in FIG. 3. The increment value $\Delta I$ is determined as a value obtained by dividing the maximum supply current value to the stepping motor 2 during the pre-hold period by the number of times the timer and counter 75 outputs the increment pulse. For example, when the maximum supply current value is 0.5 A and the number of outputs of the increment pulse is 20, the increase value $\Delta I$ is set to 0.025 mA.

In Act 5, the CPU 72 outputs parallel data corresponding to the set current value after the update to the SPI controller 76. Thereafter, the CPU 72 returns to the standby state of Act 2 and Act 3. The SPI controller 76 converts the set current value into serial data and outputs the serial data to the D/A converter 10. The D/A converter 10 supplies a voltage having a magnitude corresponding to the set current value applied as described above to the motor driver 5 as a reference voltage. The motor driver 5 adjusts the drive voltage of the stepping motor 2 so as to be close to the reference voltage, thereby supplying the drive current of the set current value to the stepping motor 2.

Figure 6:
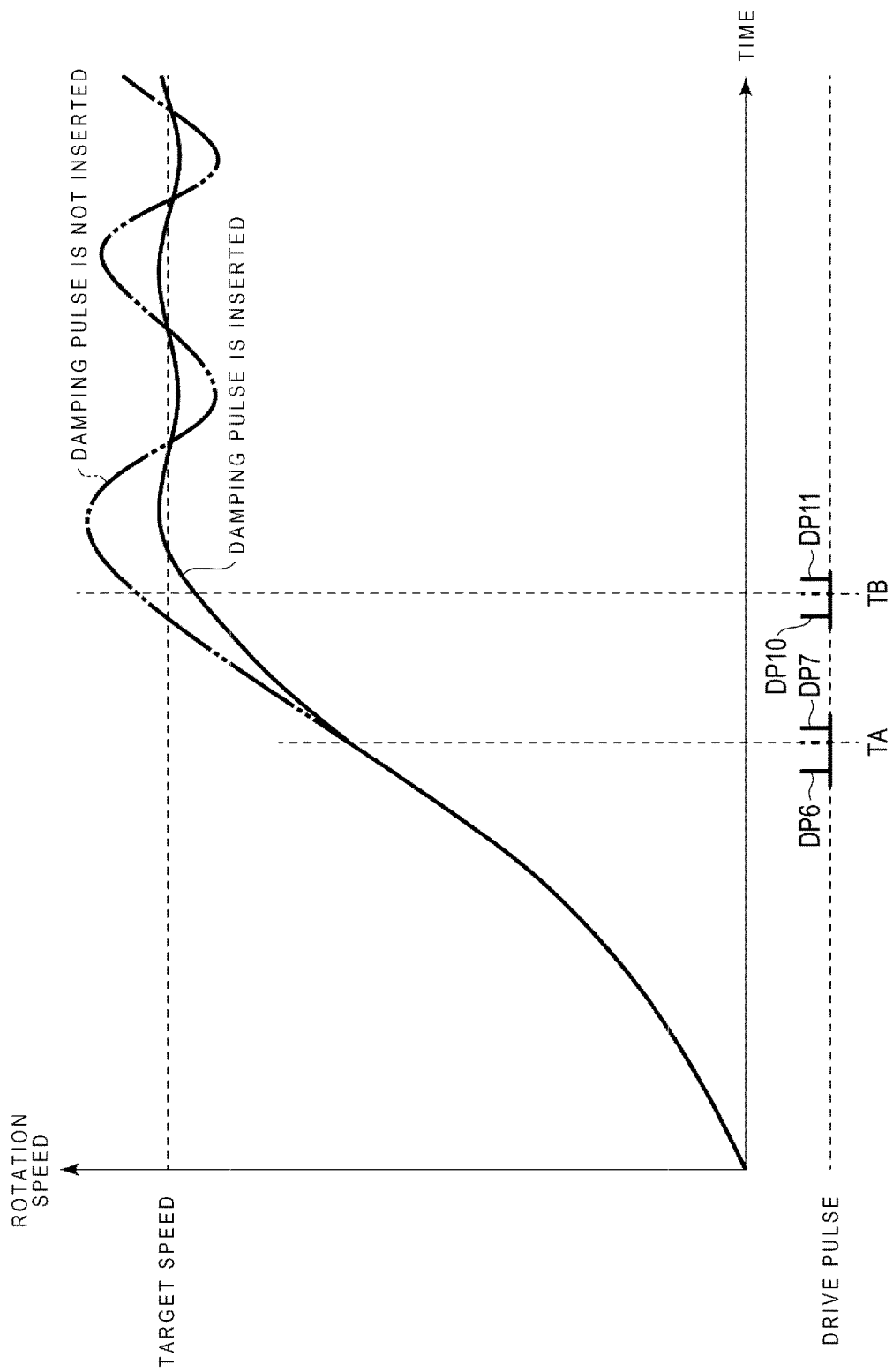
FIG. 6 is a graph illustrating a characteristic of a rotation speed of a stepping motor.

In this manner, the drive current of the stepping motor 2 is increased by a constant increment $\Delta I$ at constant time intervals as illustrated in FIG. 6. When the timer and counter 75 ends outputting the predetermined number of increment pulses, the drive current of the stepping motor 2 becomes the maximum supplying current value to the stepping motor 2 during the pre-hold period. In this state, the pre-hold period ends.

When the pre-hold period is ended, the CPU 72 makes a determination of Yes in Act 3, and proceeds to Act 6.

In Act 6, the CPU 72 sets the initial comparison value from the memory 8 in the register of the counter and register 61.

In Act 7, the CPU 72 increments a value of a variable N by one. The variable N is for managing the number of the raster to be formed on the printing medium 200. When starting the information processing illustrated in FIG. 3, the CPU 72 initializes the variable N to 0.

In Act 8, the CPU 72 sets Nth raster data of the image to be printed on the thermal head 1 as the printing target in a next strobe period.

In Act 9, the CPU 72 waits for an interruption for the information processing from the interrupt controller 71.

Additionally, the counter of the counter and register 61 counts the number of clocks from the time when the comparison value is set in the register. If the comparison value and the count value output from the counter and register 61 coincide with each other, the drive pulse generation unit 62 outputs a drive pulse to the motor driver 5 once. In the following, the fact that the comparison value and the count value coincide is referred to as "occurrence of compare match event."

Figure 5:
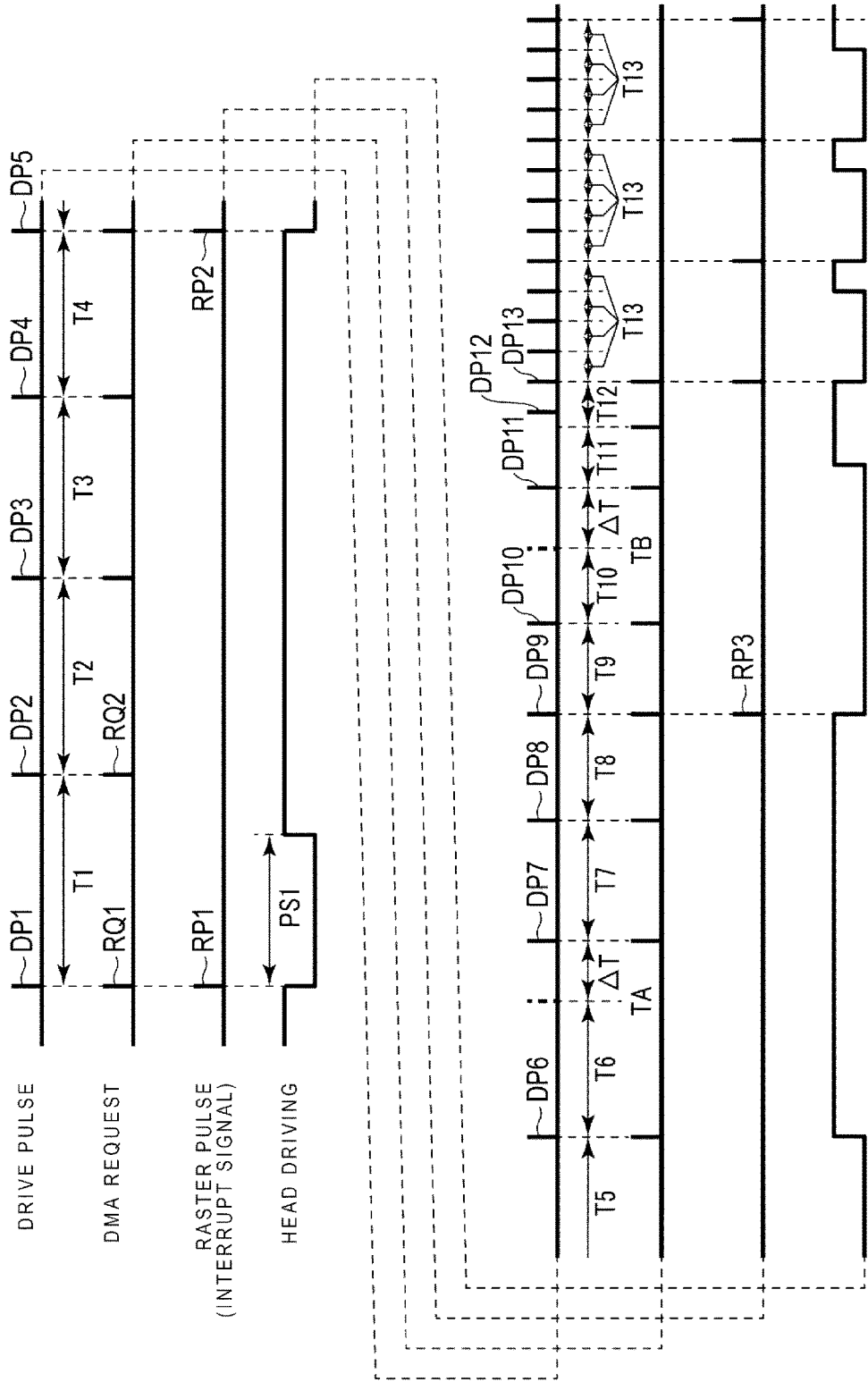
FIG. 5 is a timing chart after the first occurrence of a compare match event.

FIG. 5 is a timing chart after timing when a compare match event first occurs.

The first compare matching event occurs in response to the completion of the pre-hold period, and the drive pulse DP1 is output to the motor driver 5 from the drive pulse generation unit 62. In synchronization with this drive pulse DP1, the motor driver 5 drives the stepping motor 2 by one step using 2W1-2 phase excitation.

In synchronization with the drive pulse DP1, the interrupt control unit 64 outputs a raster pulse RP1. The head controller 65 starts in synchronization with the raster pulse RP1 and drives the thermal head 1 with the raster data set as described above in a strobe period PS1 determined in accordance with a predetermined condition. As a result, one raster of the image to be recorded is printed on the printing medium 200.

In synchronization with the drive pulse DP1, the DMA requester 63 outputs a DMA request RQ1 to the DMA controller 73, the count and register 61 and CPU 72. Upon receiving the DMA request RQ1, the DMA controller 73 sets the first comparison value C1 of the setting table from the memory 8 in the register of the counter and register 61.

Upon receiving the raster pulse RP1 as an interrupt signal, the interrupt controller 71 notifies an interrupt to the CPU 72 unless an interrupt having a higher priority than that of that interrupt occurs. Upon receiving this notification, the CPU 72 makes a determination of Yes in Act 9 in FIG. 3 and proceeds to Act 10.

In Act 10, the CPU 72 checks whether or not the variable N is the number of raster included in the image to be recorded or larger. If the variable N has not reached the number of raster, the CPU 72 makes a determination of No and returns to Act 7.

If the time period T1 elapses after the drive pulse DP1 is outputted, a new compare match event occurs in the drive pulse generation unit 62. As illustrated in FIG. 5, the drive pulse generation unit 62 outputs a next drive pulse DP2.

The DMA requester 63 outputs a DMA request each time a drive pulse is obtained. Therefore, the DMA requester 63 outputs the DMA request RQ2 in synchronization with the drive pulse DP2. Upon receiving the DMA request RQ2, the DMA controller 73 sets the second comparison value C2 of the setting table from the memory 8 in the register of the counter and register 61.

Thereafter, similarly, each time a new compare match event occurs, a drive pulse and a DMA request are output. Each time a DMA request is output, the comparison value of the setting table is sequentially set from the memory 8 in the register of the counter and register 61 in numerical order under the control of the DMA controller 73. As a result, the intervals of the drive pulses are sequentially shortened, and the stepping motor 2 completes the "slow-up."

If the raster pulse is once output, the interrupt control unit 64 counts the number of drive pulses thereafter. The raster pulse is not output in synchronization with the drive pulse until the count value reaches 4. That is, when the second to fourth drive pulses DP2 to DP4 are output, the interrupt control unit 64 does not output raster pulses because the count value is 1 to 3. Upon receiving the fifth drive pulse DP5, the interrupt control unit 64 outputs the raster pulse RP2 to the head controller 65 because the count value becomes 4.

In the register of the counter and register 61, the comparison value C6 is set according to the sixth drive pulse DP6. As described above, the comparison value C6 is set to a value obtained by $[(T6+\Delta T)/Tclk]$. Therefore, the drive pulse generation unit 62 delays the timing of outputting of the seventh drive pulse DP7 by $\Delta T$ compared to the original timing TA. As a result, the interval from the drive pulse DP6 to the drive pulse DP7 is longer than the interval from the drive pulse DP5 to the drive pulse DP6. As a result, the drive pulse DP7 functions as a damping pulse, and the acceleration of the rotation of the stepping motor 2 is temporarily suppressed.

Thereafter, the comparison value set in the register of the counter and register 61 is gradually decreased to C7, C8, and C9 so that the interval between the drive pulse DP7 and the drive pulse DP8, the drive pulse DP8 and the drive pulse DP9, and the drive pulse DP9 and the drive pulse DP10 are gradually shortened. As a result, the slow-up of the stepping motor 2 is continues.

In this manner, the CPU 72 starts supplying the drive current to the stepping motor 2 in response to the print start instruction, and controls the motor driver 5 so as to gradually increase the drive current to a predetermined maximum supply current value during the predetermined pre-hold period. Furthermore, the CPU 72 controls the motor driver 5 so as to change the current value of the drive current in a predetermined pattern so as to generate the driving force in a slow-up manner thereafter. In this manner, the CPU 72 functions as a motor control unit. The printer 100 is provided with a function as the motor driver 5 and the motor control unit, and is provided with a function as a motor control device including these functions.

Upon receiving the ninth drive pulse DP9, the interrupt control unit 64 outputs the raster pulse RP3 because the count value becomes 4. In this manner, even during the "slow-up" state, printing is performed for one raster each time the stepping motor 2 is driven by 4 steps using 2W1-2 phase excitation. The conveying amount of the printing medium 200 due to the rotation of the step angle of the stepping motor 2 coincides with the raster interval in the image to be printed. In this manner, the interrupt control unit 64 controls the thermal head 1 so as to perform printing in synchronization with a change in the position of the printing medium 200, and is provided with a function as a print control unit.

Next, in the register of the counter and register 61, the comparison value C10 is set. As described above, the comparison value C10 is a value obtained by $[(T10+\Delta T)/Tclk]$. Therefore, the timing of the eleventh drive pulse DP11 is delayed by $\Delta T$ compared to the original timing TB similar to the case of the drive pulse DP7. As a result, the interval from the drive pulse DP10 to the drive pulse DP11 is longer than the interval from the drive pulse DP9 to the drive pulse DP10. As a result, the drive pulse DP11 functions as a damping pulse, and the acceleration of the rotation of the stepping motor 2 is temporarily suppressed.

In this manner, the conveying mechanism is controlled so as to make the drive interval of the stepping motor 2 at least one time step (e.g., $\Delta T$) longer than the preceding interval before a rotation speed of the stepping motor 2 reaches the target speed.

Thereafter, the comparison value set in the register function of the counter and register 61 is gradually decreased to C11 and C12 so that the interval between the drive pulse DP11 and the drive pulse DP12, and the drive pulse DP12 and the drive pulse DP13 are gradually shortened. As a result, the slow-up of the stepping motor 2 is advanced.

If the comparison value C13 for rotating the stepping motor 2 at the target speed is set in the register of the counter and register 61, the DMA requester 63 is disabled. As a result, even if a drive pulse is output from the drive pulse generation unit 62 thereafter, the DMA requester 63 does not output the DMA request. As a result, the register of the counter and register 61 is fixed in a state where the comparison value C13 is set, and the compare match event periodically occurs at the time interval T13. That is, the drive pulse generation unit 62 periodically outputs drive pulses at constant time intervals. As a result, the stepping motor 2 receives driving pulse for one step using 2W1-2 phase excitation at constant time intervals, and eventually rotates at a constant speed. Even in such a state, the interrupt control unit 64 outputs a raster pulse each time the drive pulse is output four times. As a result, each time the stepping motor 2 is driven by 4 steps using 2W1-2 phase excitation, a state where printing for one raster is performed is maintained.

When printing of the entire raster of the image to be printed is completed, the variable N reaches the raster number of the image. Therefore, the CPU 72 makes a determination of Yes in Act 10 and proceeds to Act 6.

In Act 11, the CPU 72 enables the DMA requester 63. The CPU 72 ends the information processing illustrated in FIG. 3.

If the DMA requester 63 is enabled, the DMA requester 63 and the DMA controller 73 sequentially set the comparison value from the memory 8 in the register of the counter and register 61 to slow down the stepping motor 2. As a result, the stepping motor 2 is driven by the drive pulse generation unit 62 and the motor driver 5 so as to slow down the stepping motor 2. When the "slow-down" is completed after setting all of the comparison values, the rotation of the stepping motor 2 stops.

As described above, the printer 100 gradually increases the drive current of the stepping motor 2 to the predetermined maximum supply current value during the pre-hold period, and thereafter shifts to the slow-up. As a result, the vibration of the stepping motor 2 caused by the pre-hold can be kept small, and the period for the vibration convergence in the pre-hold period can be minimized. As a result, it is possible to shift to the slow-up in a short period of time after start-up. As described above, even if the pre-hold period is shortened, the slow-up can be started in a state where the vibration of the stepping motor 2 is small, so that the slow-up can be advanced in a desired state, thereby reducing the possibility of occurrence of the step-out.

FIG. 6 is a graph illustrating a characteristic of a rotation speed of the stepping motor 2 over a time period during the "slow-up" state.

As illustrated in FIG. 6, as compared with the case where no damping pulse is inserted, a rise of the rotation speed of the stepping motor 2 is more gradual due to a braking effect of the damping pulse, and the overshoot becomes smaller. As a result, the speed fluctuation until the rotation speed of the stepping motor 2 stabilizes at a constant speed becomes smaller, and fluctuation in the interval of the raster to be printed in this period becomes smaller. That is, according to the printer 100, deterioration in image quality due to the fluctuation in the interval of the raster can be suppressed. In the printer 100, the slow-up period of the stepping motor 2 becomes longer than when the damping pulse is not inserted. However, printing of the raster in this period is performed each time the stepping motor 2 rotates by four steps, that is, each time the printing medium 200 is conveyed a certain amount. Therefore, the interval of the raster is not affected by the insertion of the damping pulse. In this manner, according to the printer 100, over the entire time period from the start of the sub-scanning until the speed of sub-scanning has stabilized, the image can be printed without deterioration in image quality.

In addition, as described above, by starting the slow-up in a state where vibrations due to the pre-hold is very little, the effect of the vibration does not affect the effect of the insertion of the damping pulse, and the effect of inserting the damping pulse can be stably achieved.

Deterioration in image quality due to the fluctuation in the interval of the raster tends to be larger in a multi-gradation image as compared with a binary image. In a case where the thermal head 1 enables printing of the image with multi-gradations, the effect of suppressing the deterioration in image quality becomes more significant than when printing the multi-gradation image.

If at least one damping pulse is inserted during the slow-up state, the overshoot can be suppressed, and the deterioration in image quality can be suppressed as described above. However, depending on the number of inserting the damping pulse and the insertion timing thereof, the magnitude of the effect of suppressing the overshoot can change. Whether the overshoot can be effectively suppressed by changing the number of damping pulses and the their timing varies in accordance with characteristics of the stepping motor 2 and the like. Therefore, it is desirable to determine the setting table so as to optimize the number of insertions of the damping pulses and the insertion timing so that the overshoot can be effectively suppressed by simulation, experiment, or the like, and then insert the damping pulse accordingly.

The following various modifications are possible.

The change pattern of the drive current in the pre-hold period may be any pattern as long as the current value gradually increases. In addition, after the drive current reaches the maximum supply current value, the drive current may be shifted to the slow-up after a while.

The slow-up may be performed without inserting the damping pulse.

The setting table may represent a comparison value determined without adding ΔT. In this case, at the timing when the damping pulse is to be inserted, a comparison value is corrected such that the corrected comparison value contains the time period ΔT read from the setting table, and is set in the register of the counter and register 61.

The motor driver 5 may drive the stepping motor 2 by another excitation method such as 4W1-2 phase excitation, for example. If the motor driver 5 is changed so as to perform the 4W1-2 phase excitation, the interrupt control unit 64 outputs a raster pulse each time the drive pulse is input eight times.

The above embodiment is an example when the conveying amount of the printing medium 200 due to the rotation of only the step angle of the stepping motor 2 coincides with the raster interval in the image to be printed. The timing at which the interrupt control unit 64 outputs the raster pulse is changed, depending on the relationship between the conveying amount of the printing medium 200 by the rotation of only the step angle of the stepping motor 2 and the raster interval in the image to be printed.

It is also possible to perform the same operation as the above embodiment in other types of printers such as a thermal transfer printer or a light emitting diode (LED) printer.

A portion or all of the functions realized by the CPU 72 by the control processing can be realized by hardware which executes information processing not based on a program such as a logic circuit or the like. In addition, each of the above-described functions can also be realized by combining software control with hardware such as the above logic circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motor control device comprising:
  a motor driver configured to supply a drive current to a stepping motor; and
  a motor control unit configured to control the motor driver to start a supply of the drive current to the stepping motor in response to a start instruction, and increase the drive current to the stepping motor from zero to a predetermined current value stepwise with an equal incremental value in each step over a predetermined time period during which the stepping motor is in a non-rotation state, and then start outputting a drive pulse to the motor driver to accelerate the stepping motor from the non-rotation state to an operating speed during a slow-up period following the predetermined time period.

2. The motor control device according to claim 1, wherein the drive current is increased with the equal incremental value in each step that has an equal length of time.

3. The motor control device according to claim 1, wherein the equal incremental value is determined based on a value obtained by dividing a maximum current value supplied to the stepping motor by a number of increase pulses that are set to be generated during the predetermined time period.

4. A printer comprising:
a print head configured to print along a raster direction portions of an image on a printing medium in units of a raster;
a movement mechanism that includes a stepping motor and is configured to move at least one of the printing medium and the print head so as to change a relative position between the printing medium and the print head in a direction intersecting the raster direction;
a motor driver configured to supply a drive current to the stepping motor; and
a control unit configured to control the motor driver in response to a print start instruction, the control unit controls the motor driver to start a supply of the drive current to the stepping motor in response to the print start instruction, and increase the drive current to the stepping motor from zero to a predetermined current value stepwise with an equal incremental value over a predetermined time period during which the stepping motor is in a non-rotation state, and then start outputting a drive pulse to the motor driver to accelerate the stepping motor from the non-rotation state to an operating speed during a slow-up period following the predetermined time period.

5. The printer according to claim 4, wherein the control unit controls the print head so as to perform printing in synchronization with a change in the relative position between the printing medium and the print head caused by the movement mechanism.

6. The printer according to claim 4, wherein the drive current is increased with the equal incremental value in each step that has an equal length of time.

7. The printer according to claim 4,
wherein during the slow-up time period, the movement mechanism is controlled so as to make a drive interval of the stepping motor at least one time step longer than a preceding drive interval before a rotation speed of the stepping motor reaches a predetermined target speed.

8. The printer according to claim 4, wherein the equal incremental value is determined based on a value obtained by dividing a maximum current value supplied to the stepping motor by a number of increase pulses that are set to be generated during the predetermined time period.

9. A method of driving a stepping motor in a printer that includes a print head configured to print along a raster direction portions of an image in units of a raster, wherein the stepper motor moves at least one of a printing medium and the print head so as to change a relative position between the printing medium and the print head in a direction intersecting the raster direction, said method comprising:
in response to a start instruction, increasing a drive current supplied to the stepping motor from zero to a predetermined current value stepwise with an equal incremental value over a predetermined time period during which the stepping motor is in a non-rotation state; and
starting output of a drive pulse to the motor driver to accelerate the stepping motor from the non-rotation state to an operating speed during a slow-up period following the predetermined time period.

10. The method according to claim 9, wherein the drive current is increased with the equal incremental value in each step that has an equal length of time.

11. The method according to claim 9, wherein the equal incremental value is determined based on a value obtained by dividing a maximum current value supplied to the stepping motor by a number of increase pulses that are set to be generated during the predetermined time period.

* * * * *